Aug. 20, 1929.  A. A. RECTOR  1,725,104
DRAWBAR
Filed Oct. 21, 1926
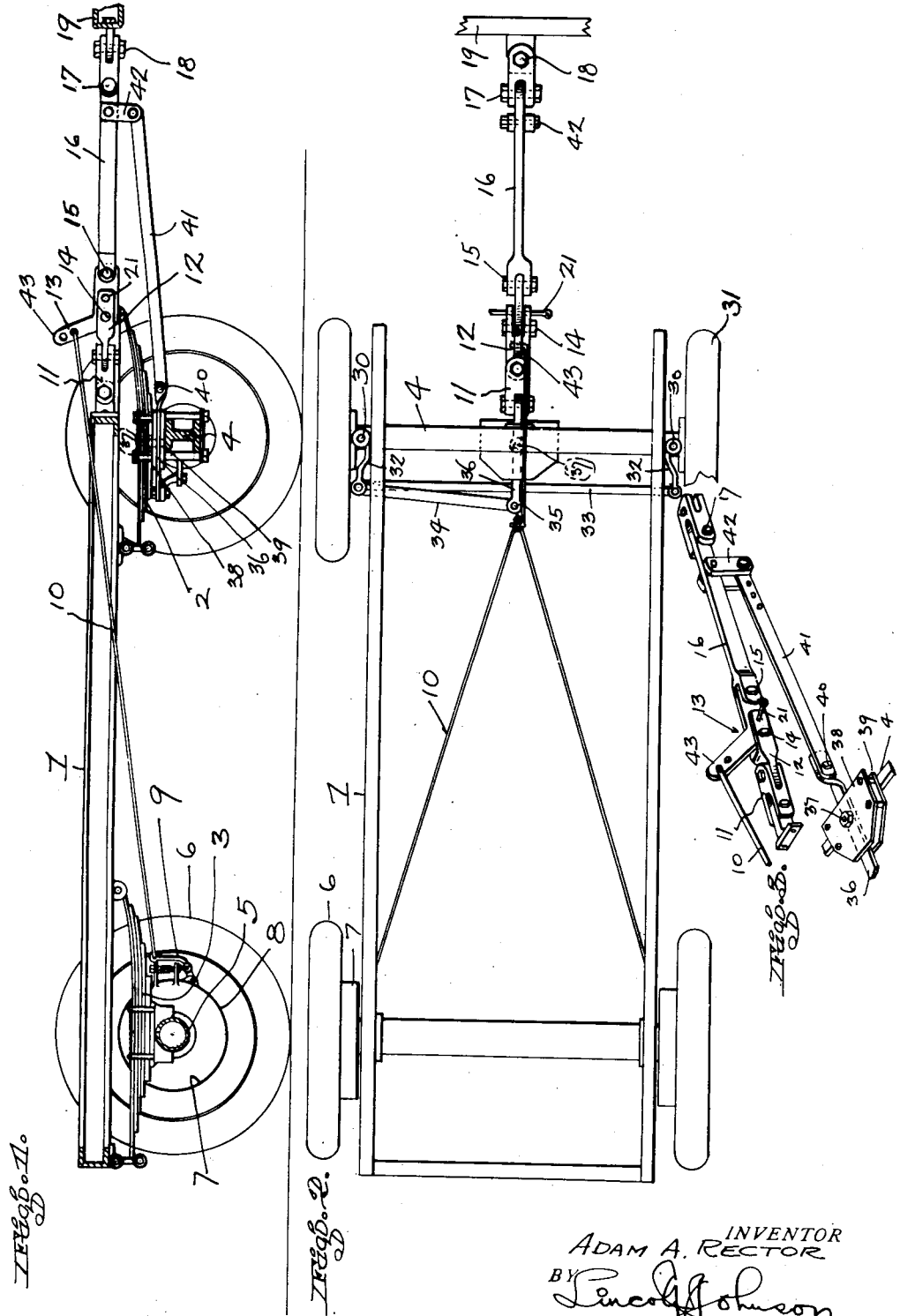
INVENTOR
ADAM A. RECTOR
BY Lincoln Johnson
ATTORNEY Patented Aug. 20, 1929.

1,725,104

UNITED STATES PATENT OFFICE.

ADAM A. RECTOR, OF SAN FRANCISCO, CALIFORNIA, ASSIGNOR TO RECTOBAR MANUFACTURING COMPANY, OF RENO, NEVADA, A TRUST ASSOCIATION.

DRAWBAR.

Application filed October 21, 1926. Serial No. 143,069.

This invention relates particularly to a draw bar to connect a pair of independent vehicles for towing purposes.

An object of the invention is to provide a draw bar to connect a towing vehicle to a towed vehicle, which said draw bar is of a telescopic construction, and is provided with means thereon to actuate a braking system on the towed vehicle.

A further object of the invention is to provide a draw bar having means thereon actuated by uncontrolled movement of the towed vehicle to apply the brakes to the said towed vehicle, in combination with a rod connecting the towing vehicle to the towed vehicle to control the wheel steering apparatus on the towed vehicle, and to operate the same in unison with the draw bar. Other objects and advantages will appear as this description progresses.

In this specification and the annexed drawings, the invention is illustrated in the form considered to be the best, but it is to be understood that the invention is not limited to such form, because it may be embodied in other forms, and it is also to be understood that in and by the claims following the description, it is desired to cover the invention in whatsoever form it may be embodied.

In the accompanying one sheet of drawings

Fig. 1 represents a vertical section through a trailer having a draw bar and steering apparatus mounted thereon constructed in accordance with my invention.

Fig. 2 is a plan view of Fig. 1.

Fig. 3 is a perspective view of the draw bar and steering bar apparatus detached from connection with the vehicles.

In detail, the construction illustrated in the drawings comprises a trailer or towed vehicle, consisting of a frame 1 connected in a conventional manner by the front and rear springs 2 and 3, respectively, to the front and rear axles 4 and 5, respectively. The rear axle 5 has traction wheels 6 rotatably mounted thereon, each of which are provided with brake drums 7 thereon around which the split brake bands 8 are mounted. The individual brake bands 8 are of the conventional type, in which one end of the split brake band is held in a relatively fixed position adjacent the brake drum 7 while the opposite end of the brake band is provided with a link lever 9 pivotally connected thereto for the purpose of drawing the brake band into frictional contact with the brake drum. The brake lever 9 is operated by a control rod 10, leading to an operating bar 43, to be hereinafter described.

The middle of the front end of the trailer frame 1 is provided with a universal coupling 11 thereon, which is pivotally connected at the free end thereof to a forked shaft 12. A bell crank 13 is confined within the forked shaft 12 and one leg of the bell crank 13 is pivoted at 14 to the forked shaft 12. The opposite end of the same leg of the bell crank 13 is pivoted at 15 to a shaft 16 which is pivotally connected at its other end 17 to a universal coupling 18 that is pivotally connected to a tractor or towing vehicle 19. The draw bar is thus comprised of the forked shaft 12, bell crank 13, and shaft 16, pivotally connected together so as to have an over all length varying between selected minimum and maximum limits. When the tractor 19 is pulling the trailer and the entire draw bar assembly is under tension, said draw bar will be extended to its maximum length. So long as any pulling effort is applied through the draw bar assembly to the trailer, all parts of said draw bar will remain in axial alignment. In the event that the tractor should back toward the trailer or if the trailer should approach the rear end of the tractor, the draw bar assembly would cant into an articulated position to shorten the over-all length of the draw bar assembly between its maximum and minimum lengths. The bell crank 13 being pivotally connected to the pair of independent shafts 12 and 16, that are connected respectively to the tractor and trailer, it is obvious that when the tractor and trailer are separated a distance less than the maximum length of the draw bar assembly, such difference is compensated for by the bell crank swinging up into a position that will suitably adjust the draw bar assembly to the space between the tractor and trailer.

The other leg 43 of the bell crank 13 is pivotally connected by a link 10 to the brake levers 9 on the traction wheel brake. Should the forward speed of the trailer become greater than that of the towing vehicle, the trailer will gradually approach the rear end of the towing vehicle, to thereby cause the draw bar assembly to assume an articulated position. The articulating movement of the draw bar causes a swinging movement of the bell crank 13, which in turn automatically actuates the trailer braking mechanism and causes the brakes to be applied on the trailer to slow the speed of the trailer to a speed equal to or less than that of the towing vehicle. As soon as the speed of the trailer is less than that of the towing vehicle, the draw bar assembly assumes its normal position, and automatically releases the brakes from the trailer wheels. In all forward or rearward movements of the trailer by the towing vehicle, the brakes on the trailer are not actuated, but when the forward speed of the trailer is uncontrolled, and the trailer tends to advance onto the towing vehicle, the operation of the draw bar is such that the brakes on the trailer are automatically applied to control the speed thereof.

Where it would be desirous to back the trailer, or reverse its movement through the draw bar assembly, I provide means to eliminate the articulating action of the draw bar, which would otherwise apply the brakes to the trailer and prevent said trailer from being backed. In order to render the draw bar assembly non-articulate, I provide registering holes through the shaft 12 and bell crank 13, through which a pin 21 is passed. The operator would pass the pin through the draw bar parts to make said bar rigid to back the said trailer, and at all other times said pin would not be engaged with the draw bar assembly.

The opposite ends of the front axle 4 are provided with wheel spindles 30 pivotally mounted thereon, and on which the front traction wheels 31 are journaled. Each of the opposite spindles have projections 32 thereon connected together by a cross bar 33. A drag link 34 is pivoted at one end to one of the spindle projections 32 while the free end of said drag link 34 is pivoted at 35 to the rear end of a steering arm 36, pivoted at 37 between spaced guide plates 38 and 39 that are mounted centrally between the ends of the front axle 4. The swinging movement of the steering bar 36 is transmitted through the drag link and cross bar 33 to the respective steering wheel spindles to cause the said wheels to turn in a direction corresponding to the direction of movement of the steering bar 36. The front end of the steering bar 36 is pivotally connected at 40 to a steering rod 41 which has its opposite end pivoted at 42 to the draw bar shaft 16. Thus, when the tractor turns either to the right or to the left, a corresponding turning movement is transmitted to the draw bar assembly and to the steering shaft, which, in turn, causes the steering bar 36 to be swung and the steering wheels on the trailer turned accordingly to follow in the same direction as that of the tractor.

Having thus described this invention, what I now claim and desire to secure by Letters Patent is:

1. The combination with a tractor and a trailer, of a universal coupling on each of said vehicles; a shaft pivoted to each coupling; a bell crank having one leg thereof pivoted at an end to one of said shafts and at its other end to the other of said shafts; and a braking mechanism on said trailer operated by a control rod, said control rod being connected to said bell crank lever.

2. The combination with a tractor and a trailer, of a universal coupling on each of said vehicles; a shaft pivoted to each coupling; a bell crank having one end thereof pivoted at an end to the shaft which is attached to the tractor and having the other end of said leg pivoted to the shaft which is attached to the trailer; the other leg of the bell crank being free; and a braking mechanism on said trailer operated by a control rod, said control rod being attached to the free end of the free leg of said bell crank lever.

In testimony whereof, I have hereunto set my hand at San Francisco, California, this 13th day of October, 1926.

ADAM A. RECTOR.